(12) United States Patent
Cascino

(10) Patent No.: US 6,262,134 B1
(45) Date of Patent: Jul. 17, 2001

(54) LOW VOLATILITY CELLULAR FOAM

(75) Inventor: Lawrence A. Cascino, South Bend, IN (US)

(73) Assignee: Gaska Tape, Inc., Elkhart, IN (US)

( * ) Notice: Subject to any disclaimer, the term of this patent is extended or adjusted under 35 U.S.C. 154(b) by 0 days.

(21) Appl. No.: 09/325,098

(22) Filed: Jun. 3, 1999

(51) Int. Cl.$^7$ ............................................. C08J 9/16
(52) U.S. Cl. ........................ 521/56; 428/523; 521/85; 521/92; 521/93; 521/95; 521/134; 521/142; 524/183; 524/184; 525/195; 525/196; 525/197
(58) Field of Search ........................ 521/142, 56, 85, 521/92, 93, 95, 134; 428/523; 524/183, 184; 525/195, 196, 197

(56) References Cited

U.S. PATENT DOCUMENTS

| | | |
|---|---|---|
| 4,252,906 | 2/1981 | Hosokawa et al. ................ 521/86 |
| 4,701,472 | 10/1987 | Koebisu et al. . |
| 5,114,985 | 5/1992 | Kuyzin et al. ...................... 521/130 |
| 5,286,761 | 2/1994 | Naujoks et al. .................... 521/172 |
| 5,321,098 | 6/1994 | Lal ........................................ 525/425 |
| 5,352,710 | 10/1994 | Lauri .................................... 521/137 |
| 5,373,029 | 12/1994 | Naujoks et al. .................... 521/172 |
| 5,439,947 | 8/1995 | Bartlett et al. ...................... 521/131 |
| 5,532,284 | 7/1996 | Bartlett et al. ...................... 521/134 |
| 5,561,187 | 10/1996 | Bechara et al. .................... 524/591 |
| 5,571,847 | 11/1996 | Hitchcock et al. ................ 521/56 |
| 5,596,021 | 1/1997 | Adembri et al. .................... 521/99 |
| 5,607,984 | 3/1997 | Duocastella-Codina et al. ... 521/172 |
| 5,672,636 | 9/1997 | Horn et al. .......................... 521/167 |
| 5,712,320 | 1/1998 | Green ................................... 521/172 |
| 5,786,402 | 7/1998 | Bruchmann et al. .............. 521/129 |
| 5,852,065 | 12/1998 | Frey et al. ............................ 521/112 |
| 5,880,241 | 3/1999 | Brookhart et al. ................ 526/348 |

*Primary Examiner*—John M. Cooney, Jr.
(74) *Attorney, Agent, or Firm*—Ice Miller; Doreen J. Gridley; Thomas A. Walsh

(57) ABSTRACT

A foam composition and method of making the same. The foam of the present invention comprises a mixture of glutarate ester plasticizer, adipate ester plasticizer, alcohol carboxylic acid ester, cell stabilizer, barium/zinc activator stabilizer, potassium/zinc activator stabilizer, azodicarbonamide blowing agent, low-fogging vinyl dispersion resin, vinyl blending resin, black acrylic pigment dispersion, and oxazoline viscosity reducer. The foam is made by the process of mixing the ingredients until a homogenous liquid mixture is present, de-airing the homogeneous liquid mixture, casting the liquid mixture on a non-fogging release-coated surface, expanding the cast liquid mixture by exposing it to an elevated temperature for a prescribed duration of time, and then either cooling the expanded mixture and winding it into rolls, or coating the stabilized composition with pressure sensitive adhesive, cooling it, and then winding it into rolls. The resulting low volatility foam is reasonable in cost of its components and in cost of manufacture and exhibits anti-fogging characteristics desired in a variety of applications.

13 Claims, No Drawings

LOW VOLATILITY CELLULAR FOAM

BACKGROUND OF THE INVENTION

1. Field of the Invention

The present invention relates generally to the field of cellular foams and the method of making the same, and, more specifically, to a cellular foam having anti-fogging characteristics.

2. Description of the Prior Art

In the automotive industry, a recognized problem has been the formation of volatile condensate or "fog" on the interior and windshield of the automobile. This residue is unsightly, and may impair the vision of the driver under certain circumstances. One source of the fogging is believed to be the flexible foam gaskets which are in place to seal the interior to exterior passageways of the automobile, such as the door, tail lights, windows, etc. When these gaskets are exposed to thermal cycling during the life of the automobile, the gaskets tend to emit volatile compounds into the interior environment of the vehicle. The volatile compounds eventually condense on the windshield and other surfaces inside the vehicle, forming the "fog." Over time, emission of the volatile compounds also will degrade the gasket to the point where it will no longer perform its intended function properly.

In response to the fogging problem, the Society of Automotive Engineers ("SAE") has developed a standard test to quantify the fogging characteristics of materials used in automotive interiors, which it issued December 1994 and has designated as SAE standard J1756. SAE standard J1756 is well known in the art, and is incorporated herein by reference. Similar standards have been established by Ford Motor Corporation, General Motors Corporation, and other automotive component manufacturers.

At present, the only foam seals known to achieve acceptable results on the SAE J1756 test have been barrier or film coated to effectively block or close the surface of the foam and thereby prohibit or reduce emission of volatiles from the foam. Although such foams satisfy the SAE J1756 test, it is desired to provide a foam which is not barrier or film coated, but which inherently has the same or similar properties and which will achieve acceptable results on these tests. One advantage to such an anti-fogging foam would be in the reduction of manufacturing costs. Foam which must be barrier or film coated is generally more costly to manufacture as additional or more expensive components are required to make such a foam, and the additional processing required to apply the barrier or film coating adds cost as well.

Another advantage of an anti-fogging foam which is not barrier or film coated would be in the enhanced conformability of the foam. Comformability is desired because, to effectively seal the interior to exterior passageways of the automobile, the foams must be adapted to fit the sometimes tight radii and intricate contours of these passageways. Barrier or film coated foam is less conformable than anti-fogging foams which do not require barrier or film coating. A more comformable foam will provide a better seal, for a longer period of time, than a less conformable foam.

It should be noted that the "fogging" problem is not unique to the automotive industry. Anti-fogging foam gaskets have applications in other areas where dirt and condensate residue would have a deleterious effect. Such applications would include, for example, electronics or semiconductor manufacturing facilities, electronics packaging, clean rooms, and medical device applications.

SUMMARY OF THE INVENTION

The present invention comprises a cellular foam composition, and method for making the same. In one embodiment, the foam comprises a mixture of glutarate ester plasticizer, adipate ester plasticizer, alcohol carboxylic acid ester, cell stabilizer, barium/zinc activator stabilizer, potassium/zinc activator stabilizer, azodicarbonamide blowing agent, low-fogging vinyl dispersion resin, vinyl blending resin, black acrylic pigment dispersion, and oxazoline viscosity reducer. The foam is made by the process of mixing the ingredients until a homogenous liquid mixture is present, de-airing the homogeneous liquid mixture, casting the liquid mixture on a non-fogging release-coated surface, expanding the cast liquid mixture by exposing it to an elevated temperature for a prescribed duration of time, and then either cooling the expanded mixture and winding it into rolls, or coating the stabilized composition with pressure sensitive adhesive, cooling it, and then winding it into rolls. The resulting low volatility foam is reasonable in cost of its components and in cost of manufacture and exhibits anti-fogging characteristics desired in a variety of applications. These results are accomplished without requiring barrier or film coating of the foam.

DESCRIPTION OF THE INVENTION

The present invention comprises a foam composition which exhibits anti-fogging characteristics without the use of a barrier or film coating. The properties of the foam composition make it suitable for use in the automotive industry and in other applications as may be found, for example, in the electronics industry, where low volatility foams are desired.

The foam composition of the present invention is made from the following component chemicals: glutarate ester plasticizer (polymeric) such as that sold by C. P. Hall under the trade name P550; adipate ester plasticizer (polymeric) such as that sold by C. P. Hall under the trade name RX13290; alcohol carboxylic acid ester such as that sold by BYK-Chemie under the trade name BYK-1142; cell stabilizer such as that sold by Air Products and Chemicals under the trade name VS103; barium/zinc activator stabilizer such as that sold by OMG Americas under the trade name RK507; potassium/zinc activator stabilizer such as that sold by Ferro Chemical under the trade name THERM CHEK 5573 SF, or that sold by Witco Chemical under the trade name MARK 1501; azodicarbonamide blowing agent such as that sold by Otsuka Chemical Company under the trade name ACT-AFOAM VI-25; low-fogging vinyl dispersion resin such as that sold by Solvay Chemical under the trade name SLAM-VIC 367 NZ; vinyl blending resin such as that sold by Occidental Chemical under the trade name OXY-567; black acrylic pigment dispersion such as that sold by Elementis Specialities under the trade name ST-8307; and oxazoline viscosity reducer such as that sold by Angus Chemical under the trade name ZOLDINE RD-20.

The basic formula for the foam composition involves combining the foregoing chemical components in the following proportions:

| COMPONENT | PARTS BY WEIGHT |
| --- | --- |
| Glutarate Ester Plasticizer (Polymeric) | 70.0–105.0 |
| Adipate Ester Plasticizer (Polymeric) | 5.0–40.0 |

-continued

| COMPONENT | PARTS BY WEIGHT |
|---|---|
| Alcohol Carboxylic Acid Ester | 1.0–4.0 |
| Cell Stabilizer | 1.5–3.0 |
| Barium/Zinc Activator Stabilizer | 5.0–8.0 |
| Potassium/Zinc Activator Stabilizer | 1.0–3.0 |
| Azodicarbonamide Blowing Agent | 2.0–12.0 |
| Low–fogging Vinyl Dispersion Resin | 50.0–75.0 |
| Vinyl Blending Resin | 25.0–50.0 |
| Black Acrylic Pigment Dispersion | 2.0–4.0 |
| Oxazoline Viscosity Reducer | 5.0–10.0 |

The following process is used to prepare the foam composition according to the present invention:

1. Mix the chemical components until homogenous in a container of adequate size. The container must be constructed of a material, such as stainless steel or carbon steel, known in the art to be non-reactive with the chemical components used in the present invention.

2. De-air the homogeneous mixture using methods known in the art for removing the air from a liquid mixture of this nature.

3. Using methods known in the art, cast the homogeneous mixture on a surface at a thickness proportional to the desired final expanded thickness and density. The surface must be a non-fogging release-coated surface such as stainless steel, paper such as that sold by Plainwell Paper under the trade name ST PAPER, polyester film, or other material known in the art not to adhere to the homogeneous mixture and not to degrade the anti-fogging characteristics of the foam.

4. Expand the cast liquid mixture into a cellular foam by exposing it to temperatures of about 350–400° F. for about 2 to 10 minutes.

5. If the foam is to include an adhesive, coat the stabilized foam with pressure sensitive adhesive.

6. Cool the foam.

7. Wind the cooled foam into rolls.

After the foam has been wound into rolls, it may be slit into appropriate widths or otherwise cut into desired shapes by methods known in the art.

One embodiment of the present invention involves combining the chemical components in the following proportions, and then processing the components according to the same method described above:

| COMPONENT | PARTS BY WEIGHT |
|---|---|
| Glutarate Ester Plasticizer (Polymeric) | 100.0 |
| Adipate Ester Plasticizer (Polymeric) | 10.0 |
| Alcohol Carboxylic Acid Ester | 1.5 |
| Cell Stabilizer | 2.00 |
| Barium/Zinc Activator Stabilizer | 7.00 |
| Potassium/Zinc Activator Stabilizer | 1.00 |
| Azodicarbonamide Blowing Agent | 10.00 |
| Low-fogging Vinyl Dispersion Resin | 50.00 |
| Vinyl Blending Resin | 50.00 |
| Black Acrylic Pigment Dispersion | 3.00 |
| Oxazoline Viscosity Reducer | 7.00 |

This particular composition of the foam was tested for its anti-fogging characteristics according the Photometric Procedure described in SAE standard J1756. This test procedure includes the steps of: (a) taking an initial glossmeter reading ($R_O$) from a condensate receptacle; (b) subjecting several test specimens of the foam for three (3) hours to conditions designed to cause the release of volatile materials from the foam and the subsequent condensation of these volatile materials on the condensate receptacle; (c) taking a final glossmeter reading (R) from the condensate receptacle after the conclusion of the test period; and (d) repeating the test several times. The average of the initial glossmeter readings from the several tests ($R_{O(avg)}$) is computed, as is the average of the final glossmeter readings ($R_{(avg)}$). From these measurements a ratio ($R_{(avg)}$)/($R_{O(avg)}$) is computed. For this composition of the foam, the ratio ($R_{(avg)}$/$R_{O(avg)}$) from several tests was at least sixty percent (60%).

It will be appreciated by those of skill in the art that the foam of the present invention exhibits anti-fogging characteristics which are desired in a myriad of applications, including but not limited to those in the automotive industry, electronics and semiconductor manufacturing facilities, electronics packaging, clean rooms, and medical device applications. The foam is made with readily available components and is made by a method containing very few steps and requiring very few constraints. Therefore, the anti-fogging foam is reasonable in cost of its components and in manufacture.

Those skilled in the art also will appreciate that the foam of the present invention possesses a conformability which exceeds that possessed by foams which are barrier or film coated. In automotive and other applications, the foam of the present invention will provide a better seal, for a longer period of time, than a less conformable, barrier or film coated foam.

While this invention has been described as having a preferred design, the present invention can be further modified within the scope and spirit of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

I claim:

1. A composition comprising a mixture of:
   glutarate ester plasticizer;
   adipate ester plasticizer;
   alcohol carboxylic acid ester;
   cell stabilizer;
   barium/zinc activator stabilizer;
   potassium/zinc activator stabilizer;
   azodicarbonamide blowing agent;
   low-fogging vinyl dispersion resin;
   vinyl blending resin;
   black acrylic pigment dispersion; and
   oxazoline viscosity reducer.

2. The composition of claim 1, wherein:
   the glutarate ester plasticizer initially is present in about 70.0 to about 105.0 parts by weight;
   the adipate ester plasticizer initially is present in about 5.0 to about 40.0 parts by weight;
   the alcohol carboxylic acid ester initially is present in about 1.0 to about 4.0 parts by weight;
   the cell stabilizer initially is present in about 1.5 to about 3.0 parts by weight;
   the barium/zinc activator stabilizer initially is present in about 5.0 to about 8.0 parts by weight;

the potassium/zinc activator stabilizer initially is present in about 1.0 to about 3.0 parts by weight;

the azodicarbonamide blowing agent initially is present in about 2.0 to about 12.0 parts by weight;

the low-fogging vinyl dispersion resin initially is present in about 50.0 to about 75.0 parts by weight;

the vinyl blending resin initially is present in about 25.0 to about 50.0 parts by weight;

the black acrylic pigment dispersion initially is present in about 2.0 to about 4.0 parts by weight; and the oxazoline viscosity reducer initially is present in about 5.0 to about 10.0 parts by weight.

3. The composition of claim 1, wherein:

the glutarate ester plasticizer initially is present in about 100.0 parts by weight;

the adipate ester plasticizer initially is present in about 10.0 parts by weight;

the alcohol carboxylic acid ester initially is present in about 1.5 parts by weight;

the cell stabilizer initially is present in about 2.0 parts by weight;

the barium/zinc activator stabilizer initially is present in about 7.0 parts by weight;

the potassium/zinc activator stabilizer initially is present in about 1.0 parts by weight;

the azodicarbonamide blowing agent initially is present in about 10.0 parts by weight;

the low-fogging vinyl dispersion resin initially is present in about 50.0 parts by weight;

the vinyl blending resin initially is present in about 50.0 parts by weight;

the black acrylic pigment dispersion initially is present in about 3.0 parts by weight; and the oxazoline viscosity reducer initially is present in about 7.0 parts by weight.

4. The composition of claim 1, wherein the mixture is mixed until homogeneous;

de-aired;

cast as a liquid material on a non-fogging release-coated surface;

exposed to an elevated temperature for a prescribed duration of time; and cooled.

5. A low volatility cellular foam, comprising the composition of claim 1.

6. The low volatility cellular foam of claim 5, having anti-fogging characteristics such that when tested for sixteen hours according to the Photometric Procedure described in SAE standard J1756 of December 1994, the ratio of the average final glossmeter reading to average initial glossmeter reading is at least sixty percent (60%).

7. A method for making a cellular foam comprising the steps of:

(a) adding at least about 70.0 parts by weight glutarate ester plasticizer, at least about 5.0 parts by weight adipate ester plasticizer, at least about 1.0 parts by weight alcohol carboxylic acid ester, at least about 1.5 parts by weight cell stabilizer, at least about 5.0 parts by weight barium/zinc activator stabilizer, at least about 1.0 parts by weight potassium/zinc activator stabilizer, at least about 2.0 parts by weight azodicarbonamide blowing agent, at least about 50.0 parts by weight low-fogging vinyl dispersion resin, at least about 25.0 parts by weight vinyl blending resin, at least about 2.0 parts by weight black acrylic pigment dispersion, and at least about 5.0 parts by weight oxazoline viscosity reducer to a mixing container;

(b) mixing the ingredients until a homogenous liquid mixture is present;

(c) de-airing the homogeneous liquid mixture;

(d) casting the liquid mixture on a non-fogging release-coated surface;

(e) expanding the cast liquid mixture by exposing it to an elevated temperature for a prescribed duration of time; and (f) cooling the expanded mixture.

8. The method of claim 7, wherein the elevated temperature of step (e) is within the range of about 350–400° F.

9. The method of claim 7, wherein the prescribed duration of time of step (e) is within the range of about 2 to 10 minutes.

10. The method of claim 7, wherein:

the glutarate ester plasticizer initially is added in about 70.0 to about 105.0 parts by weight;

the adipate ester plasticizer initially is added in about 5.0 to about 40.0 parts by weight;

the alcohol carboxylic acid ester initially is added in about 1.0 to about 4.0 parts by weight;

the cell stabilizer initially is added in about 1.5 to about 3.0 parts by weight;

the barium/zinc activator stabilizer initially is added in about 5.0 to about 8.0 parts by weight;

the potassium/zinc activator stabilizer initially is added in about 1.0 to about 3.0 parts by weight;

the azodicarbonamide blowing agent initially is added in about 2.0 to about 12.0 parts by weight;

the low-fogging vinyl dispersion resin initially is added in about 50.0 to about 75.0 parts by weight;

the vinyl blending resin initially is added in about 25.0 to about 50.0 parts by weight;

the black acrylic pigment dispersion initially is added in about 2.0 to about 4.0 parts by weight; and the oxazoline viscosity reducer initially is added in about 5.0 to about 10.0 parts by weight.

11. The method of claim 7, wherein:

the glutarate ester plasticizer initially is added in about 100.0 parts by weight;

the adipate ester plasticizer initially is added in about 10.0 parts by weight;

the alcohol carboxylic acid ester initially is added in about 1.5 parts by weight;

the cell stabilizer initially is added in about 2.0 parts by weight;

the barium/zinc activator stabilizer initially is added in about 7.0 parts by weight;

the potassium/zinc activator stabilizer initially is added in about 1.0 parts by weight;

the azodicarbonamide blowing agent initially is added in about 10.0 parts by weight;

the low-fogging vinyl dispersion resin initially is added in about 50.0 parts by weight;

the vinyl blending resin initially is added in about 50.0 parts by weight;

the black acrylic pigment dispersion initially is added in about 3.0 parts by weight; and the oxazoline viscosity reducer initially is added in about 7.0 parts by weight.

12. The method of claim 7, further comprising the step, prior to step (f), of coating the stabilized composition with a pressure sensitive adhesive.

13. The method of claim 7, further comprising the step of:

(g) winding the cooled foam into rolls.

* * * * *